United States Patent [19]

Grangé et al.

[11] 4,199,664
[45] Apr. 22, 1980

[54] TELEPHONE LINE CIRCUIT

[75] Inventors: Jean-Claude C. Grangé, Cagnes sur Mer; Philippe Hernandez, Nice; Daniel F. Reynès, Villeneuve Loubet; Jean-Pierre L. Suzzoni, Cros de Cagnes; Nghiem H. Tu, LaGaude, all of France

[73] Assignee: International Business Machines Corporation, Armonk, N.Y.

[21] Appl. No.: 889,772

[22] Filed: Mar. 24, 1978

[30] Foreign Application Priority Data

Mar. 31, 1977 [FR] France .................................. 77 10338

[51] Int. Cl.$^2$ ............................................. H04M 3/00
[52] U.S. Cl. ........................ 179/18 FA; 179/18 HB; 179/84 R
[58] Field of Search ........... 179/18 FA, 18 F, 18 HB, 179/84 R, 84 A, 81 R, 81 A

[56] References Cited

U.S. PATENT DOCUMENTS

| | | | |
|---|---|---|---|
| 3,435,152 | 3/1969 | Gunter et al. | 179/84 R |
| 3,748,391 | 7/1973 | Shaffer | 179/84 R |
| 4,001,516 | 1/1977 | Weisigk et al. | 179/84 R |
| 4,071,709 | 1/1978 | Lee et al. | 179/18 HB |

Primary Examiner—Thomas A. Robinson
Attorney, Agent, or Firm—Frederick D. Poag

[57] ABSTRACT

A circuit associated with a telephone line to detect line status includes a first detector sensitive to the line current phase, a second detector sensitive to the ringing voltage phase, and two pulse generators of the same frequency as the ringing voltage, appearing at the positive and negative zero-crossings of the ringing voltage, respectively. When only the ringing current is applied to the line, only the signals from both detectors and one generator are simultaneously present (once per period). When the called subscriber lifts his handset, the signals from both detectors and the other generator are also simultaneously present once per period. These pulse coincidences are detected and processed by an appropriate logic.

22 Claims, 18 Drawing Figures

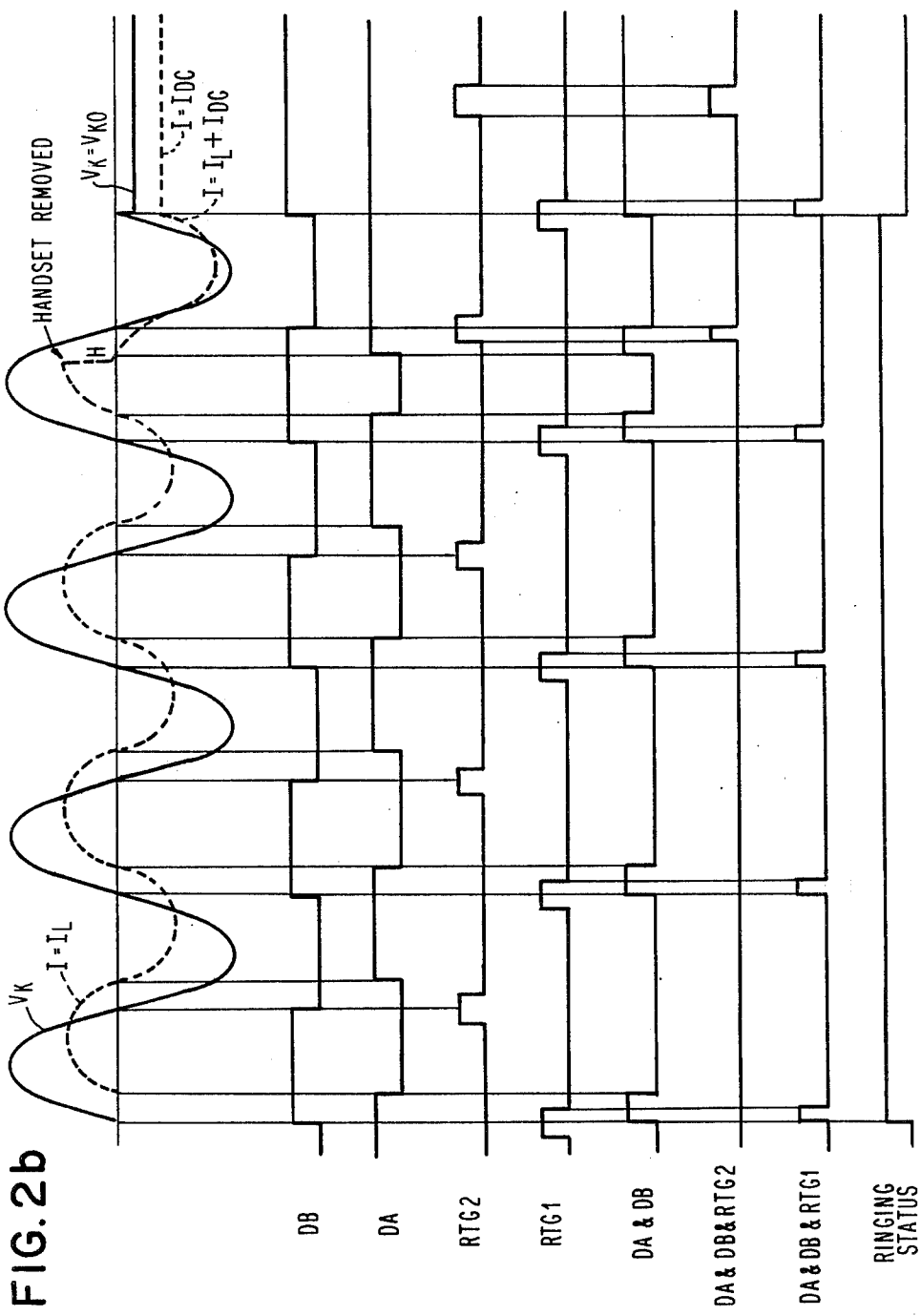

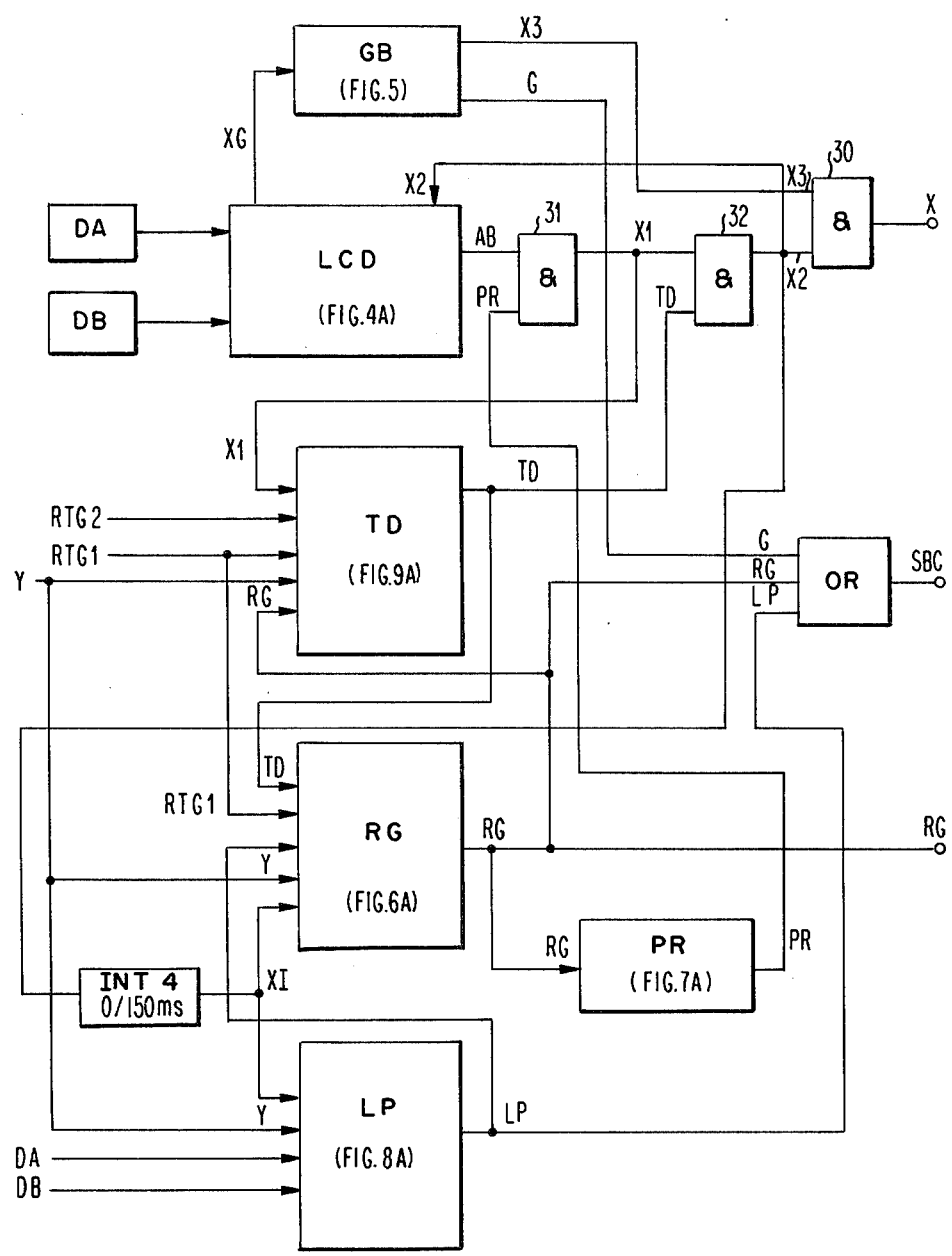

T1 < 50 ms
T2 > 50 ms
—— CONTROL < 75 ms
--- CONTROL > 75 ms

TELEPHONE LINE CIRCUIT

BACKGROUND OF THE INVENTION

1. Field of the Invention

This invention concerns a telephone line circuit and, more particularly, a detection device for detecting the "off hook" status of the telephone set during ringing.

2. Description of the Prior Art

In present telephone installations, a subscriber is called by sending an a.c. current through the line from the telephone exchange, which current operates the bells of the subscriber's telephone set. This current is generated from a relatively high a.c. voltage supply (several tens of volts), and with a frequency which varies according to the countries (in the range of several tens of hertz). When, after ringing, the subscriber removes his handset, the loop circuit of this set is closed and a d.c. current is superimposed on the a.c. ringing current. It is, of course, necessary to detect when the handset has been removed; in addition, this detection must be carried out as fast as possible so as to prevent the subscriber from hearing the ringing frequency in his earpiece.

Detection of the d.c. loop current when the ringing current is being sent is a particularly delicate operation in view of the high voltage and low frequency of the ringing current.

The prior art devices to stop sending the ringing current are, generally, comprised of relays which are conceived so as to be as insensitive to the ringing current as possible and which are implemented with contacts which stop the sending of the ringing current as soon as the d.c. current is operated. Such relays are cumbersome, expensive and very difficult to adjust. In addition, they are not readily compatible with modern electronic component line circuits.

Other devices are also well-known in prior art, which are utilized to stop sending the ringing current with the help of threshold detectors, i.e., which are adapted to make discrimination between the presence of the ringing current, alone or the presence of both ringing current and loop current, simultaneously. It is, unfortunately, difficult to have these circuits insensitive to the noise signals which, then, simulate the loop current, such as, for instance, the longitudinal noises.

More generally, most of the prior art devices have made use of analog techniques in that their operations are essentially based upon comparative electrical measurements such as current or voltage, so that such devices can be utilized only under well-known conditions.

SUMMARY OF THE INVENTION

Therefore, the main object of this invention is to provide for a new telephone line circuit wherein discrimination between the various states such as "on hook" ringing current status, "off hook" ringing current status, speech status, dialing status, idle status, etc., is made with the help of logic means.

Another object of this invention is to provide for a line circuit wherein detection when the subscriber has removed his handset while the ringing current is being sent, is independent of the noise currents such as, for instance, longitudinal noises.

Another object of this invention is to provide for a line circuit having a perfect symmetry in "idle line" status (i.e. the handset is replaced) as well as in speech status and ringing status.

Another object of this invention is to provide for an electronic component line circuit with integrated facilities, i.e., less expensive and more reliable.

Still another object of this invention is to provide for a line circuit wherein detection of the removal of the handset while the ringing current is being sent, does not depend on the ringing frequency.

Still another object of this invention is to provide for a line circuit which is highly protected against short-circuits.

According to a preferred embodiment of this invention which will be disclosed in more detail further on, the subscriber's loop circuit, proper, may be comprised of conventional elements, namely a ground terminal, a first resistor, the first half-winding of the line transformer, the telephone set circuits (handset, bells, etc.), the second half-winding of the line transformer, a second resistor and a negative voltage supply $-V$.

According to one feature of this invention, the ringing bus line through the intermediary of which the ringing current is distributed, is connected to the line circuit on wire "b" side (i.e., through the branch between the second half-winding of the transformer and supply $-V$), through the intermediary of a bidirectional switch breaker, i.e., a breaker which passes the two half-waves of the ringing current. The closure of this breaker is controlled by pulses coming from a first pulse generator, the frequency of said pulses being identical with that of the ringing current, said pulses, in addition, being sent with a slight lead over the positive zero crossings of the ringing voltage. A second generator is also provided for delivering pulses of the same frequency as that of the ringing current, but in that case, these pulses being sent with a slight lead over the negative zero crossings of the ringing voltage.

The circuit according to this invention, in addition, is comprised of a first detector connected on wire "a" side (i.e., to the branch connected to the ground terminal), and which is sensitive to the current flowing through this wire. It is also comprised of a second detector connected on wire "b" side, and which is sensitive to the voltage present at any given point on this wire.

When the ringing current is flowing through the line while the handset is replaced, the second detector detects the positive half-wave with no phase-shift with respect to the ringing voltage. On the contrary, the first detector detects the negative half-wave with a lead or lag with respect to the voltage (since this detector is sensitive to the current), according as the telephone set presents a capacitive impedance or a self-impedance (i.e. inductive impedance) at the conventional ringing frequencies.

Thus, in ringing status, both detectors are simultaneously energized for a very short period of time, once per cycle. This time-period is always started or terminated when the voltage goes through zero according as the telephone set presents a capacitive impedance or a self-impedance, resulting in the control pulses which come from at least one of the two pulse generators, being always out of this time-period.

When the subscriber removes his handset in answer to the bells, a d.c. current is sent from the ground terminal to voltage supply $-V$, and is superimposed on the ringing current. It results therefrom that the first detector will remain energized after the zero crossing of the ringing current and, therefore, the signals from the two detectors and a pulse from one of the pulse generators will be simultaneously present for a short period of time, and, thereafter, the signals from the two detectors and a pulse from the other pulse generator will be simultaneously present for a short period of time.

A mere logic operation makes it possible to detect the sequential occurrence of these coincidences and, in response thereto, to control the opening of the ringing switch breaker, thereby stopping having the ringing current sent.

The foregoing and other objects, features and advantages of the present invention will be apparent from the following description of a preferred embodiment of the invention as illustrated in the accompanying drawings.

BRIEF DESCRIPTION OF THE DRAWINGS

FIG. 2b illustrates, in a schematic way, the shapes of both voltages and currents involved in the circuit shown in FIG. 1 during the ringing and "handset removed" phases, as well as the logic signals involved in the detection of this handset removal, in the case the set is a self-impedance set.

FIG. 3 is a schematic diagram of the logic assembly associated with the line circuit shown in FIG. 1.

DETAILED DESCRIPTION

Figure 1:
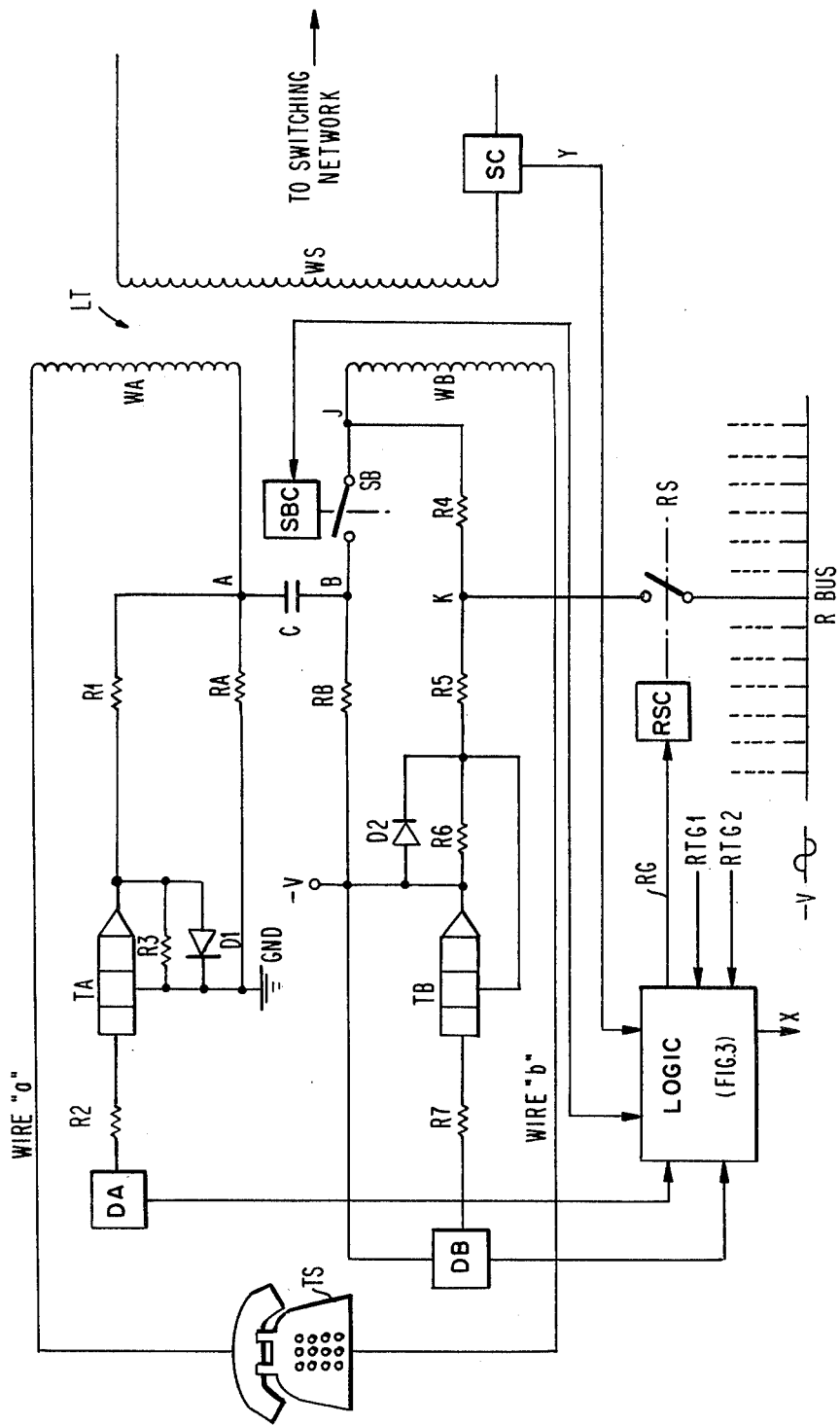
FIG. 1 is a schematic diagram of a telephone line circuit according to this invention.

FIG. 1 shows an example of the telephone line circuit according to this invention.

This circuit comprises a conventional loop circuit, i.e., a ground terminal GND, a first resistor RA, a first half-winding WA of the line transformer LT, the telephone set circuits TS, the second half-winding WB of line transformer LT, a second resistor RB and a negative d.c. voltage supply $-V$. A relay switch breaker SB, the function of which will be disclosed further on, is inserted between winding WB and resistor RB. The circuit also comprises a decoupling capacitor C connected, in the conventional way, between terminals A and B and resistors RA and RB respectively. According to this invention, the line circuit also comprises a first additional arrangement formed of resistor R1 (branched to connection point A connecting winding WA to resistor RA), transistor TA, resistor R2 and detector DA which transforms the collector voltage of the transistor into a logic level. The circuit of transistor TA is comprised of a bias resistor R3 connected between the base and the emitter of this transistor, and diode D1 parallel-connected with resistor R3 and which is adapted to short-circuit this resistor should the voltage be reversed between the emitter and the base. The base of transistor TA is connected to ground GND.

Likewise, the line circuit is comprised of a second additional arrangement formed of resistors R4, R5, R6 which are connected between terminal J of winding WB and voltage supply $-V$, transistor TB, resistor R7, and detector DB which transforms the collector voltage of the transistor into a logic level. The emitter of transistor TB is connected to voltage supply $-V$ and its base is connected to the common point between resistors R5 and R6, resistor R6 being the bias resistor of the transistor. Diode D2, parallel-connected with resistor R6, is adapted to short-circuit the latter should the voltage be reversed between the emitter and the base.

Still referring to FIG. 1, the secondary winding WS of line transformer LT is shown, which makes it possible to connect, as far as the speech currents are concerned, the telephone line with the switching network of the exchange. With the use of scanning device SC, it is possible to know the circuit status, at any moment (i.e., whether it is d.c. current-fed), the status information produced on line Y by device SC being utilized in the logic portion of the device according to this invention, as it will be shown in more detail further on (FIG. 3).

The ringing current is sent to the telephone set TS from a ringing bus or line R BUS which produces a 50 Hz sinusoidal current oscillating about a negative voltage $-V$ (i.e., being of the same value as that of the central battery which provides the line with a d.c. current). Line R BUS feeds a line group in the exchange (or all the lines in the exchange in case the latter is a relatively low capacity exchange).

Line R BUS is connected to point K of the line circuit through a relay switch RS operated by control RSC. This control is energized when the logic of the line circuit (shown in FIG. 3) produces a ringing control signal on the output RG.

This control signal is derived from a number of data sent to the logic, more specifically through detectors DA and DB, and through line Y (as shown in FIGS. 3 and 6), but this signal is sent when the ringing voltage is about to go through a zero crossing (a positive zero crossing, for instance), only so as to prevent breaker RS from being deteriorated too rapidly. Likewise, when the ringing current must stop being sent, this signal disappears when the voltage is about to go again through a zero crossing, for the same reasons as before. This is obtained with the help of generator RTG1 which permanently produces pulses of a frequency identical with the ringing frequency (50 Hz), and which are applied to the logic circuits as an additional condition whether the ringing current must be sent or stopped. These pulses are generated with a slight lead over the positive zero crossings of the ringing voltage, allowing for the lag of relay RSC.

Figure 2A:
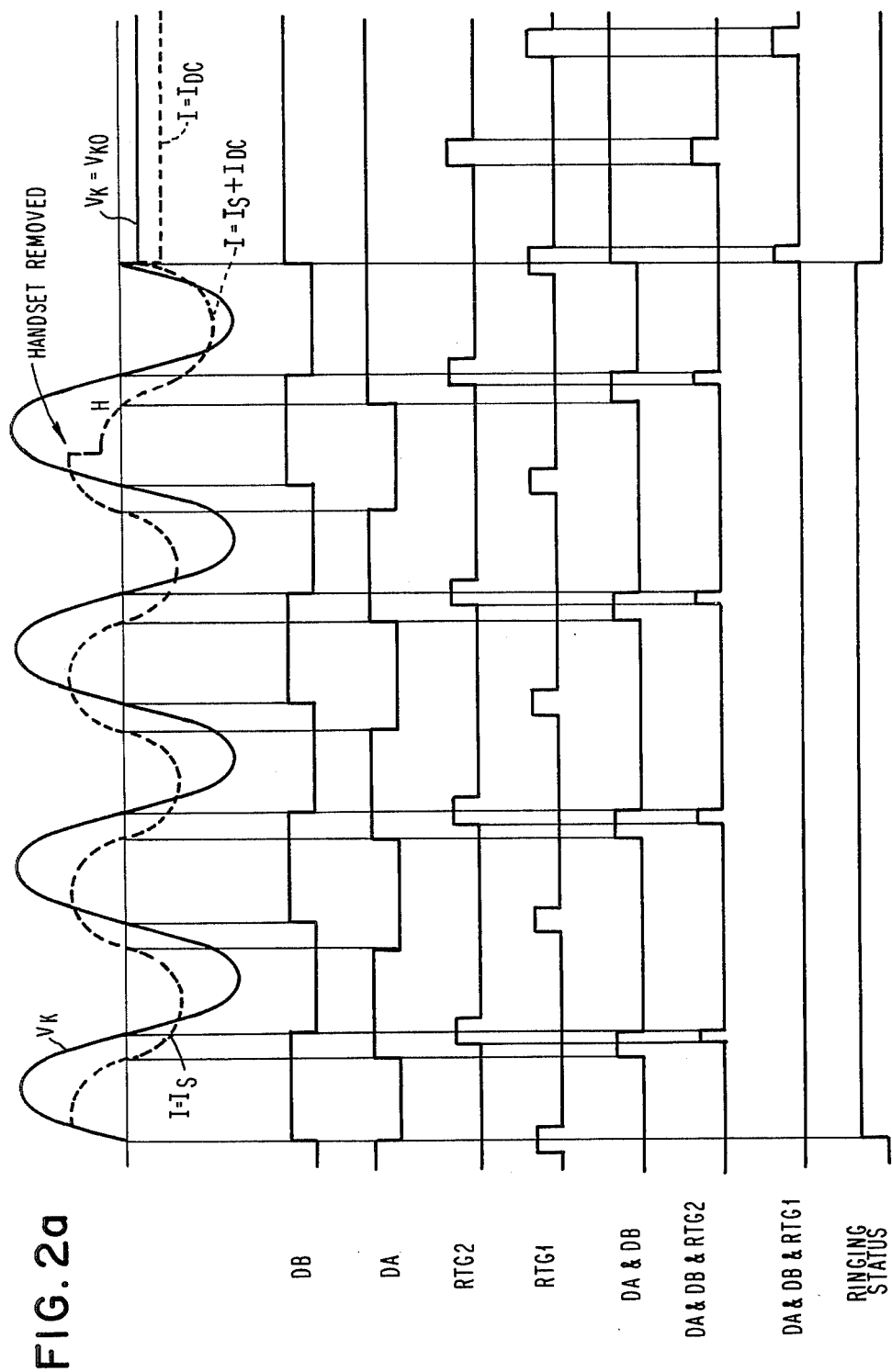
FIG. 2a illustrates, in a schematic way, the shapes of both voltages and currents involved in the circuit shown in FIG. 1 during the "ringing" and "handset removed" phases, as well as the logic signals involved in the detection of this handset removal, in the case the set is a capacitive impedance set.

In FIG. 2a, voltage $V_K$ at point K is illustrated by the solid line, and current I which flows through the line wires is illustrated by the dotted line.

With reference to FIGS. 1 and 2a, a circuit according to this invention will be described, which is adapted to detect when the d.c. current appears while the ringing current is being sent, i.e., to detect when the called subscriber removes his handset. There will be considered, first, the case when the telephone set is a capacitive impedance set.

When the telephone set is at rest (the telephone set line is idle), contact SB is open, no current is flowing through the line circuit (with the exception of possible noise currents such as longitudinal currents, which will be studied further on), and both detectors DA and DB are not operated.

When the system logic determines that the ringing current must be sent, the ringing control circuit RG is operated as soon as the first pulse appears in circuit RTG1 (which is permanently operated). Relay RSC is energized and contact RS is closed.

During the first half-wave, which is positive with respect to $-V$, most of the ringing current $I_S$ is flowing from line R BUS, through resistor R4, winding WB, wire "b", the bells of set TS (which are operated by this current), wire "a", winding WA, resistor RA, to ground GND. A portion of the current is flowing also through resistors R5 and R6 to voltage supply $-V$, which results in saturating transistor TB and operating detector DB. FIG. 2a shows that the output signal from detector DB is in phase with the ringing voltage because the impedance formed of resistors R5 and R6 is resistive and the current which is flowing through these resistors, then, is in phase with the voltage at point K. Another portion of the current is flowing also through resistor R1 and diode D1 to ground, which results in blocking transistor TA ("off" condition).

During the second half-wave, which is negative with respect to $-V$, most of the current $I_S$ is flowing from ground GND, through resistor RA, winding WA, wire "a", the bells of set TS (which are then operated by this current), wire "b", winding WB, resistor R4 to line R BUS. A portion of the current is also flowing from ground, through resistors R3 and R1, which results in saturating transistor TA and operating detector DA. The output signal from detector DA, which is schematically illustrated in FIG. 2a, is phase-leading over the ringing voltage since it has been supposed that the impedance in the circuit under consideration, is capacitive, and the current which flows in resistor R3, therefore, is leading over the voltage. Another portion of the current is also flowing from voltage supply $-V$, through diode D2 and resistor R5, to the line R BUS, which results in blocking transistor TB.

In view of the leading phase-shift of the signal coming from detector DA, the output signals from both detectors are simultaneously present during a short period of time just before the negative zero crossings of the ringing voltage.

Figure 9A:
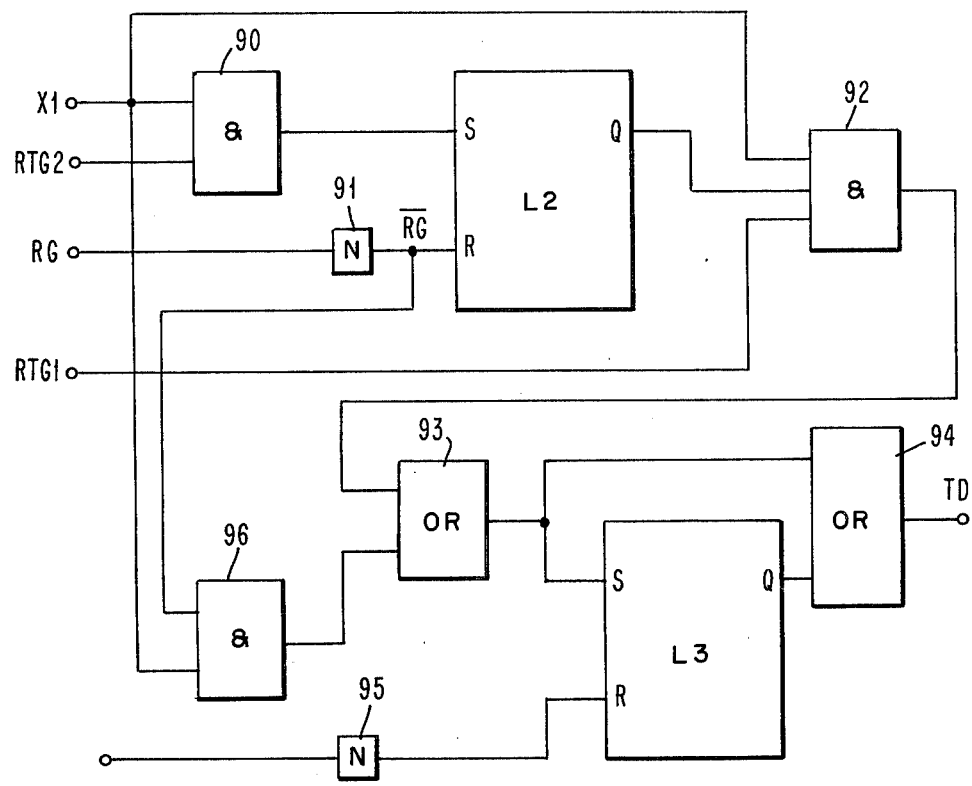
FIG. 9a is a schematic diagram of "off hook" status detector or "trip detector" TD shown in FIG. 3, and FIGS. 9b and 9c illustrate the logic signal shapes at various characteristic points of this detector.

As mentioned above and illustrated in FIG. 2a, the control pulses coming from circuit RTG1 are produced when the positive zero crossings occur, and, therefore, the signals coming from both detectors together with these pulses are never simultaneously present when the ringing current is being sent. On the contrary, since the pulses coming from generator RTG2 are transmitted a short while before the ringing voltage goes through zero crossings (negative crossings) the signals coming from the two detectors together with the pulses coming from generator RTG2 will be simultaneously present (as shown in FIG. 2a). This coincidence is detected by AND gate 90 (FIG. 9a) and memorized through latch L2 (FIG. 9a).

When the called subscriber removes his handset, a d.c. current of amplitude $I_{DC}$ is sent from ground GND, through resistor RA, winding WA, wire "a", the telephone set (handset circuits), wire "b", winding WB, resistors R4, R5, R6, to voltage supply $-V$. This current is, of course, added algebraically to ringing current $I_S$ in the line wires.

In FIG. 2a, in order to make the description clearer, it has been assumed that the handset has been removed just a little after the midpoint of a positive half-wave of the ringing current. All through this cycle, the direction of the current flowing through the branch from point K to voltage supply $-V$, is not varied and, therefore, detector DB remains operated.

On the other hand, once the current I has changed its direction (point H) through the line, a current is flowing through resistors R3 and R1 from ground to point A, which results in making transistor TA conducting and energizing detector DA.

During the following half-wave (negative), detector DB is de-energized anew since a current is flowing through diode D2 and resistor R5 from voltage supply $-V$ to point K, thereby blocking transistor TB. On the other hand, detector DA remains energized and will be so, as long as d.c. current $I_{DC}$ is flowing through the line.

As shown in FIG. 2a, detectors DA and DB are again simultaneously energized during the period of time preceding the negative zero crossing of voltage $V_K$ and, as the pulse coming from generator RTG2 is also present during this same period of time, this coincidence is detected anew by AND gate 90 (FIG. 9a) and memorized through latch L2 (FIG. 9a).

At the very beginning of the following half-wave (positive), detector DB is energized anew but since detector DA is still energized, coincidence between the signal received by both detectors together with the pulse generated by generator RTG1, is immediate. This coincidence is detected by AND gate 92 which receives also, as an input, the information coming from the direct output of latch L2 which, when fed, is indicative that coincidence between the signals coming from DA, DB and the pulse coming from RTG2, has been detected before.

The signal coming from AND gate 92 is considered as a characteristic of the "off hook" status. This status is detected by the system control unit which, in response thereto, controls the de-energization of the ringing circuit RG as well as the de-energization of relay RSC next time the ringing voltage goes through zero. Voltage $V_K$ is then stabilized at value $V_{KO}$ and the current which flows through the line is limited to d.c. current $I_{DC}$.

In FIG. 2b, the curves and signals corresponding to those of FIG. 2a, have been illustrated but, this time, the telephone line is a self-impedance line, i.e., during the ringing phase, current $I_S$ is lagging over the voltage. Like the preceding case, the detection of the "off hook" status is carried out by detecting the coincidence between the signals coming from detectors DA, DB and the pulses coming from generator RTG1 after detection of coincidence between the signal coming from detectors DA, DB and the pulse coming from generator RTG2.

According to one aspect of this invention, the logic associated with the line circuit has been conceived so as to supply all the logic control or information necessary for the supervision of the line circuit. A preferred embodiment of this logic has been shown in FIG. 3. In this figure, the following abbreviations have been used:

"&" is an AND gate

"OR" is an OR gate

"N" is a Logic Inverter

"SS" is a "single shot" and the accompanying digit is indicative of the time-length of the pulse generated by this single-shot circuit.

"Int" is an Integrator; the first accompanying digit is indicative of the lag caused upon energization, and the other accompanying number is indicative of the lag caused upon de-energization.

This logic is comprised of the following inputs:

DA is the logic signals produced by detector DA

DB is the logic signals produced by detector DB

RTG1 is the signals coming from generator RTG1

RTG2 is the signals coming from generator RTG2

Y is the logic information produced by scanner SC and indicative of the status (either fed or not) of the switching network junction point which the considered line is connected to.

From these pieces of information, the logic of FIG. 3 provides supervisory signals which are delivered by the following outputs:

X, the condition of which is a characteristic of the open or closed status of the subscriber's loop circuit. This information X is processed by the central logic of the telephone system in order to determine one of the possible following states, namely, called subscriber "off hook" status, calling subscriber "off hook" status, "pulses dialled" status, "connection to a multifrequency receiver requested" status (ground button), etc., with respect to the previous status of the loop circuit and the time-length of each status.

SBC, which is the relay control circuit opening contact SB.

Y, already mentioned as an input, but which can also be utilized by the central logic of the system.

RG, which is the ringing control circuit (see FIG. 1).

There will now be studied how the logic shown in FIG. 3 is adapted to fulfill the above mentioned supervisory functions.

This logic is comprised of a number of logic elementary units illustrated in FIG. 3 by mere blocks in order to make the understanding clearer. These blocks will now be explained in more detail with reference to FIGS. 4a, 4b through 9a, 9b, 9c and with reference to FIG. 3 when necessary.

Figure 4A:
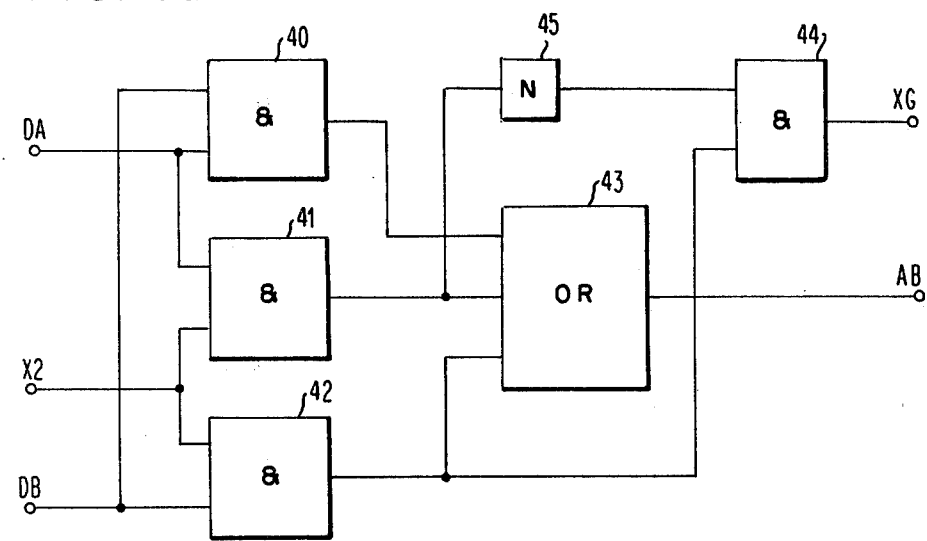
FIG. 4a is a schematic diagram of the loop current detector LCD shown in FIG. 3.
Figure 4B:
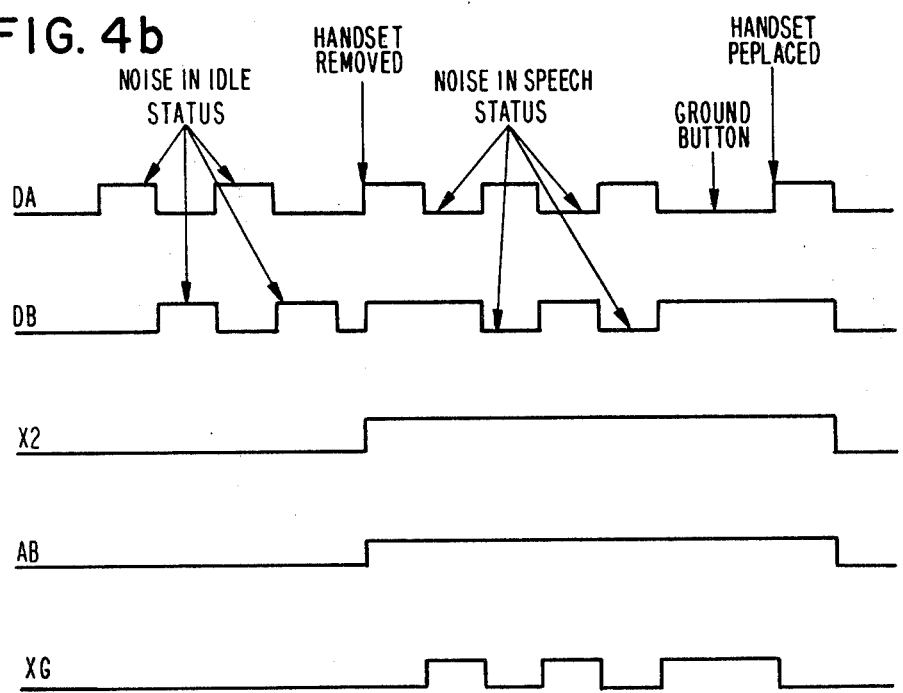
FIG. 4b illustrates the logic signal shapes at various characteristic points of said detector.

Loop Current Detector LCD (FIGS. 4a, 4b)

The purpose of this logic unit is to correctly detect the presence of a significative subscriber's loop current, even when longitudinal noises are present (output AB). It is also adapted to detect short line disconnections appearing on wire "a" side, i.e., on the ground button side (output XG).

This unit includes three inputs: DA, which receives the signals from detector DA; DB, which receives the signals from detector DB, and X2. This input X2 comes from the general logic shown in FIG. 3; as a matter of fact, it is operated during all the period of time elapsing between the "off hook" status and the "on hook" status, as this will be shown further on.

The longitudinal noises are a.c. currents induced into both wires ("a" and "b") of the telephone line by external supplies (mains, high voltage lines, etc.). These noises appear on both lines in the form of signals with identical phases and voltages with respect to ground.

Detector DA detects the current that flows through wire "a", which is negative with respect to ground, and detector DB detects the current that flows through wire "b", which is positive with respect to $-V$.

Thus, when the line is idle (the handset is replaced), detectors DA and DB are never subject to the longitudinal noises, at the same time.

In order to operate line AB, the logic is such that the two detectors must be energized simultaneously (AND gate 40 is conducting). Therefore, there is no possible simulation of an "off hook" status because of the longitudinal noises.

When the line is busy, the logic is such that, for an "on hook" status to be detected, detectors DA and DA must be both de-energized (a condition when none of the AND gates 40, 41 and 42 are conducting, thereby blocking OR gate 43). In this case, too, simulation of the "on hook" status because of the longitudinal currents, cannot occur.

Any line disconnection or grounding on wire "a" side (i.e., on the ground button side) which may result from the operation of the ground button, is detected by AND gate 44. Indeed, the conditions necessary for such a disconnection to occur, are as follows:

The telephone set must be in "off hook" status, i.e., X2 must be energized (condition 1).

Detector DB must be energized (condition 2);

Detector DA must be de-energized (condition 3).

Conditions 1 and 2 are sent through the input of AND gate 44 connected to the output of AND gate 42. Condition 3 is sent through the input of AND gate 44 connected to the output of AND gate 41, through intermediary of inverter 45.

These various conditions have been shown schematically in FIG. 4b which illustrates the output AB as being insensitive to noises, independently whether the line is busy or not.

The two noise pulses appearing at the output XG before the actual ground button pulse, will not be taken into account owing to the operation carried out by the logic unit GBD which will now be described.

Figure 5A:
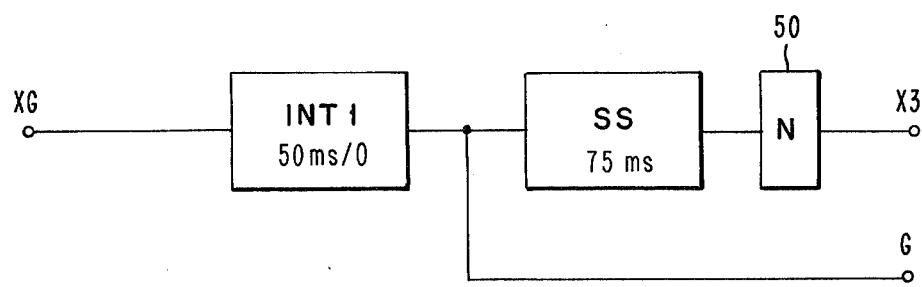
FIG. 5a is a schematic diagram of the ground button detector GBD shown in FIG. 3.
Figure 5B:
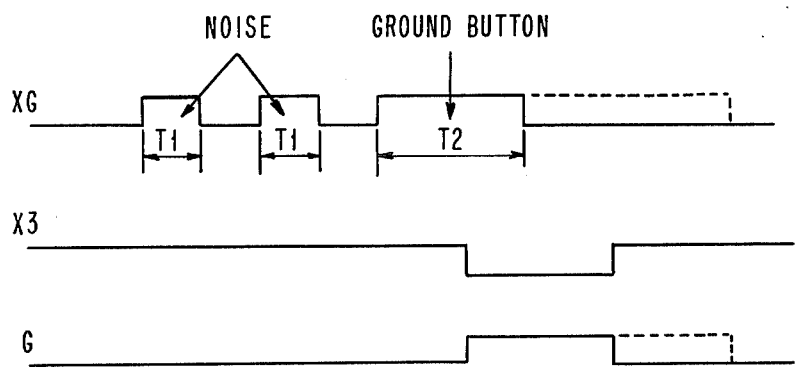
FIG. 5b illustrates the logic signal shapes at various characteristic points of this detector.

Ground Button Detector GBD (FIGS. 5a, 5b)

The ground button signal is produced by the telephone set by grounding the subscriber's loop circuit, on the wire "a" side, as a rule. This signal must be valid only after detection of the "off hook" status (a condition necessarily implied in the signal appearing on line XG, as seen just before). Integrator INT1 introduces a 50 ms delay so that the longitudinal noises cannot simulate such a signal. Finally, single-shot SS produces a calibrated pulse (a 75 ms pulse) which, upon logic inversion (inverter 50) leads to de-energization of line X3. Since line X3 is combined with line X2 ("off hook" status characteristic) through AND gate 30 (FIG. 3) in order to produce the output signal X, instantaneous de-energization of line X3 will entail de-energization of line X, i.e., will simulate a 75 ms loop current cut-off.

Unit GBD is also comprised of an output G coming from integrator INT1, which is intended to energize relay SBC (see FIG. 3), thereby breaking contact SB during the operation of the ground button (when the grounding occurs on the wire "b" side).

FIG. 5b illustrates the signals which appear on lines XG, X3 and G.

Figure 6A:
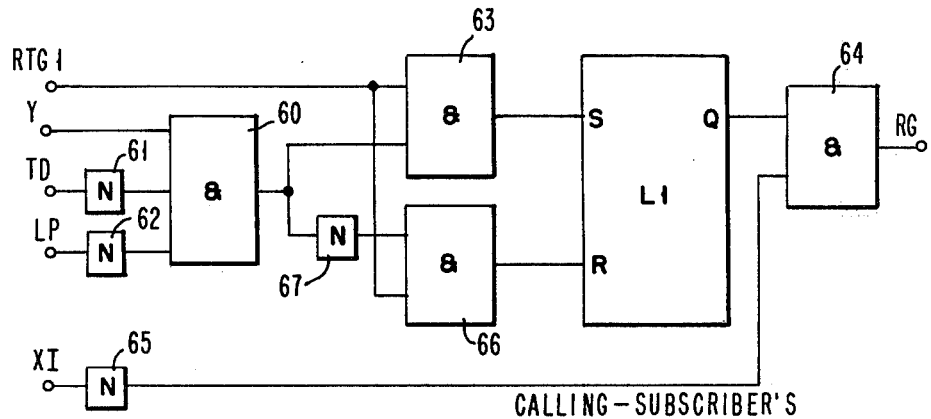
FIG. 6a is a schematic diagram of the ringing logic circuit RG shown in FIG. 3, and FIGS. 6b and 6c illustrate the logic signal shapes at various characteristic points of this circuit.
Figure 6B:
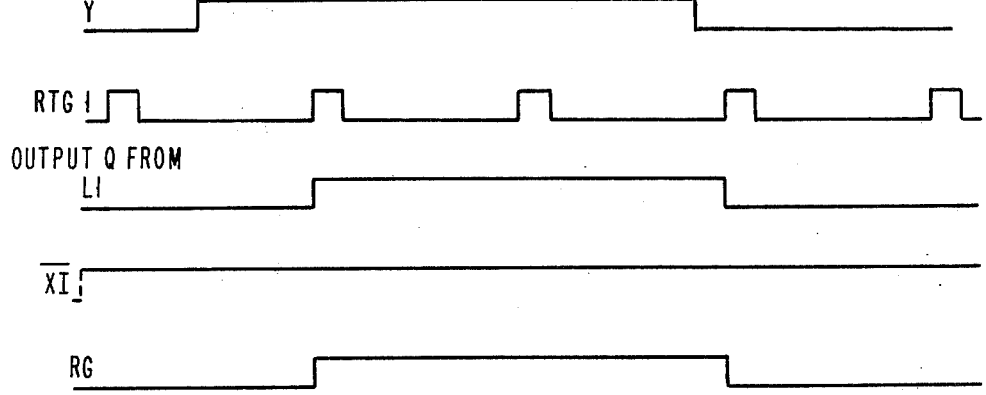
Figure 6C:
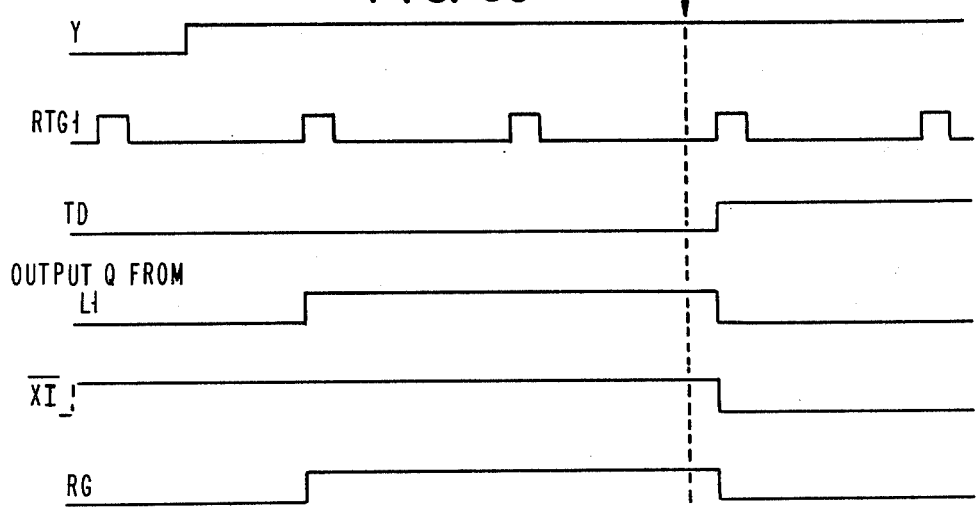

Ringing Control Circuit RG (FIGS. 6a, 6b, 6c)

The basic conditions necessary to send the ringing current are as follows:

Line Y must be energized for, when the bells are operated, a path will have already been established from the secondary winding WS of line transformer LT, through the switching network, (not shown) up to a junctor therein (condition 1), and The telephone set line must be idle, i.e., the handset is replaced (condition 2), and A ringing control pulse (coming from RTG1) must be present (condition 3).

The basic conditions necessary to stop sending the ringing current are as follows:

A signal disappears from line Y (for instance, the calling subscriber, replaces his handset before the called subscriber removes his), The called-subscriber has removed his handset (this information is given by logic unit TD, as further explained), or a misoperation has occurred (this information is given by unit LP, as further explained, also).

AND gate 60, which receives signal Y, TD (which is inverted by inverter 61) and LP (inverted by inverter 62) supplies condition 1 when conditioned (sending of the ringing current).

AND gate 63, which receives the output signals from AND gate 60 together with the pulses coming from generator RTG1, supplies conditions 1 and 3 when conditioned (sending of the ringing current). When both conditions are met, the output of AND gate 63 sets latch L1 the direct output Q of which drives AND gate 64. A second input of AND gate 64 receives the signal coming from XI (after its being inverted by inverter 65), this signal, as a matter of fact, being identical with the signal coming from X2 (see FIGS. 4a and 3) but with a 150 ms-fall delay in order to avoid disturbances during dialing (the 150 ms delay is longer than the duration of the dialing pulses). This second input supplies "on hook" status condition 2 when conditioned, thereby making AND gate 60 conducting when the three above-mentioned conditions are met.

The ringing current is stopped being sent either when latch L1 is reset and/or when line XI is energized (i.e., then the telephone set is in "off hook" status.

Latch L1 is reset by the output signals of AND gate 66 the inputs of which inverted signals (inverter 67) coming from the output of AND gate 60. The pulses coming from RTG1 are adapted to reset latch L1 and, therefore, to stop the ringing current when the voltage goes to zero. The inverted output of AND gate 60 is adapted to reset the latch, and, therefore, to stop the ringing current either when the calling subscriber has replaced his handset (signal Y is removed) or when the called subscriber has removed his handset (signal TD is applied), or when a misoperation appears (signal LP is applied).

FIG. 6b illustrates the signals which appear on characteristic lines of the circuits shown in FIG. 6a when the ringing current has been sent but with the calling subscriber replacing his handset before the called party has answered, or with the called party not answering.

FIG. 6c illustrates also the signals which appear on characteristic lines of the circuits shown in FIG. 6a when the ringing current has been sent with the called party removing his handset.

Figure 7A:
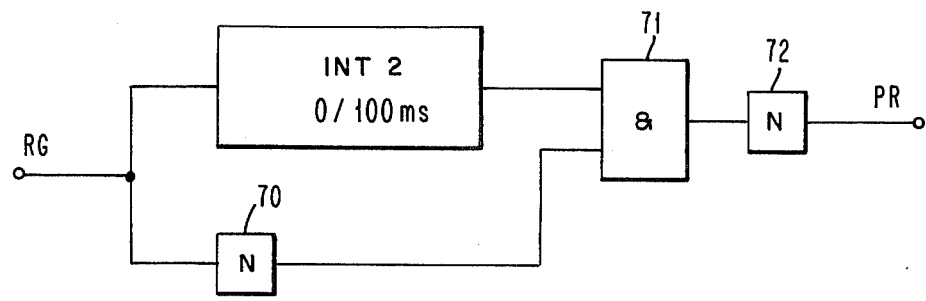
FIG. 7a is a schematic diagram of the ringing protection circuit PR shown in FIG. 3.
Figure 7B:
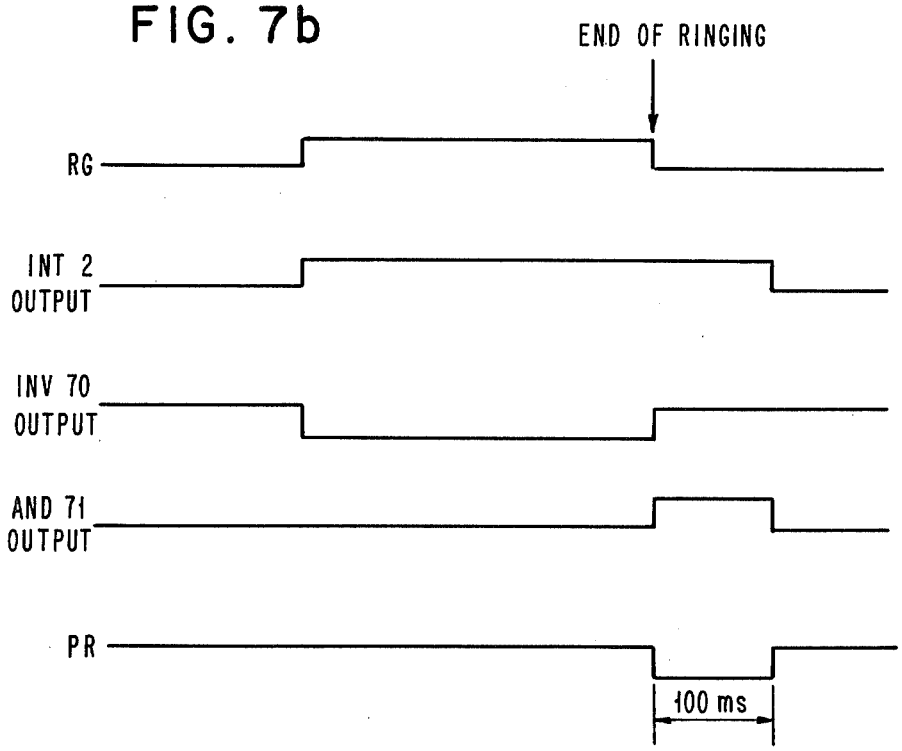
FIG. 7b illustrates the logic signal shapes at various characteristic points of this circuit.

Ringing Phase Protection Circuit PR (FIGS. 7a, 7b)

This unit is essentially comprised of:

Integrator INT2 which receives the ringing control signal RG and 100 ms-delays the removal of this signal;

Logic inverter 70 which also receives this very signal RG;

AND gate 71 which receives the output signals of integrator INT2 and inverter 70, respectively.

Inverter 72 which receives the output signal of AND gate 71 and produces ringing protection signal PR.

FIG. 7b illustrates the logic signals which appear on the outputs of these various logic elements with respect to signal RG.

It can be observed that, when the ringing current stops being sent, line PR is de-energized during 100 ms. Since this line is combined, through AND gate 31 (FIG. 3), with line AB which comes from loop current detector LCD, it results therefrom that the output X1 of said gate 31 and, consequently, lines X2 and X (FIG. 3), will be de-energized during the same period of time. The purpose of this instantaneous de-energization of line X when the ringing current stops is to enable the line and telephone set capacitances to discharge through the feed resistor without disturbing detection at the loop current level.

Figure 8A:
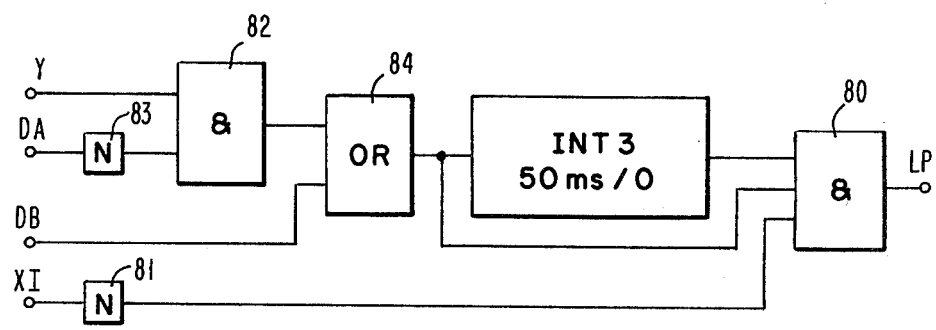
FIG. 8a is a schematic diagram of the line protection circuit LP shown in FIG. 3.
Figure 8B:
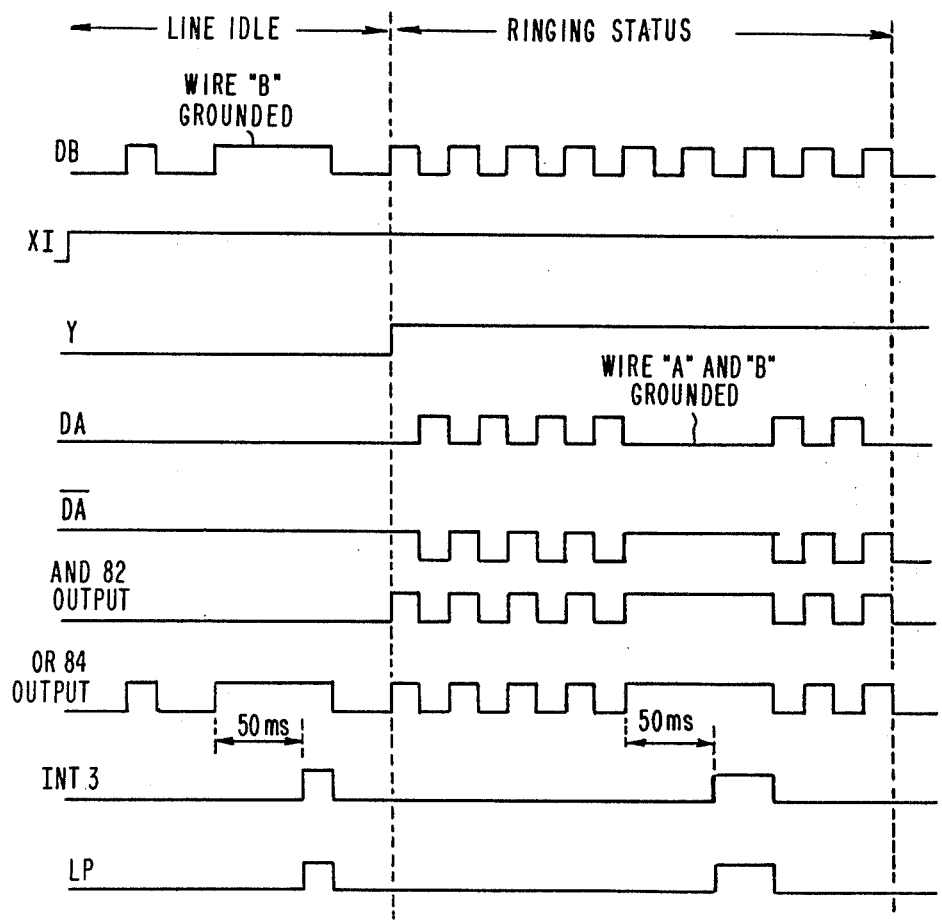
FIG. 8b illustrates the logic signal shapes at various characteristic points of this circuit.

Line Protection Circuit LP (FIGS. 8a, 8b)

With this control, it is possible to detect and handle two types of misoperations; grounding of wire "b" when the line is idle, and grounding of wires "a" and "b" when the ringing current is being sent.

First Case: When wire "b" is grounded while the line is idle, detector DB is energized. If, when a 50 ms-period has elapsed, which is determined by integrator INT3 (in order to get rid of the noise signals of short duration), detector DB is still energized, the output line LP of the line protection logic unit operations the control of relay SBC (FIG. 3). This results in disconnecting the feed resistor RB (which is of small value, say in the order to 300 Ω for instance) and passing the current through resistor R5 (which is of high value, in the order of 10 kΩ, for instance). Therefore, the value of the current is substantially reduced, and the circuit is protected.

The signal coming from LP is produced by the output of AND gate 80 the inputs of which (three in number) receive:

the output of integrator INT3 (positively going signal DB is 50 ms delayed), signal DB (not delayed), signal XI inverted (inverter 81). The first two inputs are characteristics of the "time duration of signal DB is longer than 50 ms" condition; the third input is a characteristic of the idle status of the telephone line.

Second Case: When both wires "a" and "b" are grounded while the ringing current is being sent, detector DA is ground-short-circuited and only detector DB is energized. Thus, in that case, in ringing phase, detector DA is never energized. This condition is met through the output of AND gate 82 one input of which receives signal Y (which is present during ringing), and inverted output (inverter 83) of detector DA.

The output of AND gate 82 drives integrator INT3 through intermediary of OR gate 84 (which is also driven by line DB); it results therefrom that, when the signal which appears at the output of OR gate 84 is longer than 50 ms (still in order to get rid of the noise signals of short duration), line LP is fed.

In both types of misoperation, line LP will inhibit the ringing control (see FIGS. 3 and 6a) i.e., it will prevent the ringing current from being sent, in the first case, and will stop it, in the second case.

FIG. 8b, is a schematic diagram of the logic waveforms at different characteristic points of logic shown in FIG. 8a for the two types of misoperation which have just been described.

Figure 9B:
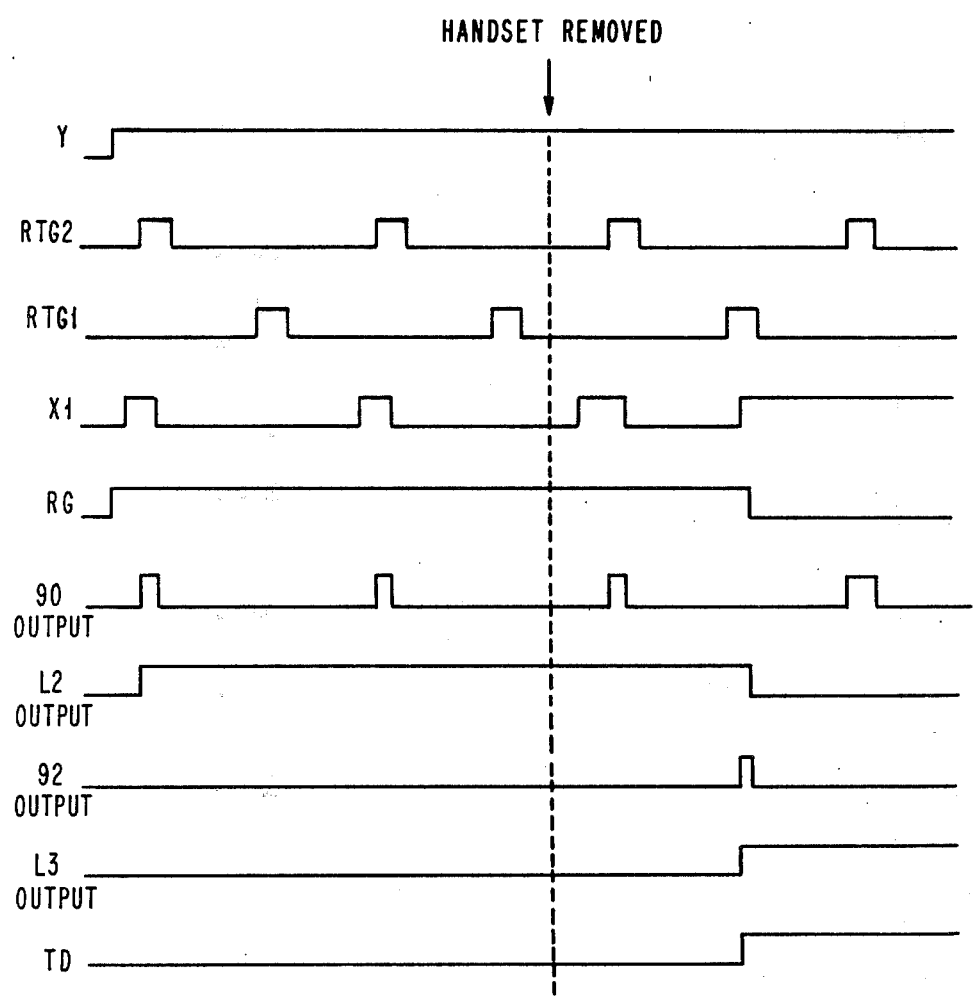
Figure 9C:
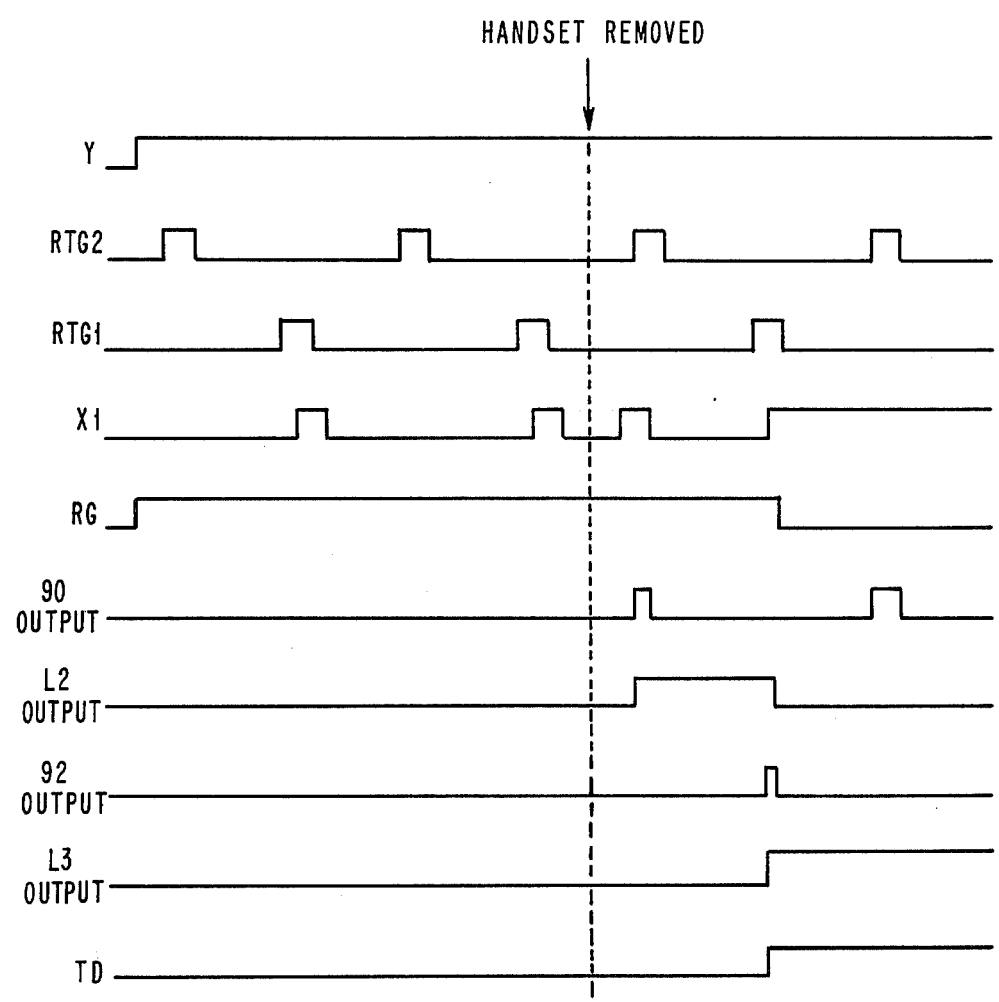

Trip Detector TD (FIGS. 9a, 9b, 9c)

The general principle of the "off hook" or "trip" detection during ringing has been disclosed above with reference to FIGS. 1, 2a and 2b. FIG. 9a shows details of the logic adapted to derive the "trip" detection signal TD.

AND gate 90 detects when the signals coming from X1 (i.e., detectors DA and DB are simultaneously energized) and RTG2, are coincident. This detection is memorized in latch L2 (input S) which is reset when the current stops being sent (signal RG inverted by inverter 91).

AND gate 92 detects when the following conditions are simultaneously met:
detectors DA and DB are simultaneously energized (input connected to line X1),
the signals of detectors DA, DB and signal RTG2 have been previously detected as being coincident (input connected to output Q of latch L2),
pulse coming from RTG1.

This detection, as seen above with reference to FIGS. 1 and 2a, is a characteristic of the called-subscriber's "off hook" status while the current is being sent. After the detection signal passing through OR gate 93, it is memorized into latch L3 (direct input S) the direct output of which Q produces the "trip" detection signal TD. This signal TD is combined, through AND gate 32 (FIG. 3) with signal X1 which comes from AND gate 31, in order to produce signal X2.

At the end of each call, latch L3 must be reset in order to be ready to detect next "off hook" status during ringing. That is why its reset input R is connected to the output of inverter 95 the input of which receives signal Y. This latch, therefore, is reset each time the subscriber's loop is disconnected from the switching network.

The "off hook" status outside the ringing time period is detected by AND gate 96 the inputs of which are connected to line X1 (DA and DB are both energized) and to the output of inverter 91 (no ringing), respectively. This status is directly transmitted to the output TD of the "trip" detector, through OR gates 93 and 94.

FIG. 9b illustrates the logic waveforms which appear at the most characteristic points of the circuits shown in FIG. 9a, when a capacitive impedance telephone set is concerned. FIG. 9c illustrates the signal which appears at the same points when a self impedance telephone set is concerned.

In order to simplify the specification and drawings, the generators or sources of the sampling pulses RTG1 and RTG2, and other elements such as the telephone, detectors, voltage level and ring signal supplies, etc., have been shown and described in terms of the waveforms provided. The internal circuits of such elements can be implemented in any convenient manner utilizing well known technology, such as for example clocking circuits, operational amplifiers, and other pulse forming circuits, and conventional data processing and telephone equipment.

While the invention has been particularly shown and described with reference to a preferred embodiment thereof, it will be understood by those skilled in the art that various changes in form and detail may be made therein without departing from the spirit and scope of the invention.

What is claimed is:

1. A telephone line circuit of the type which includes:
    a telephone set,
    a line transformer comprising first and second primary half-windings, and a secondary winding for connection to a switching network,
    a d.c. voltage supply,
    a ground terminal,
    a first circuit branch connecting the first terminal of said telephone set to said ground terminal through intermediary of said first half-winding and a first resistor,
    a second circuit branch connecting the second terminal of said telephone set to said voltage supply through intermediary of said second half winding and a second resistor,
    a capacitor connected between the terminal of said first resistor opposite to that connected to ground and the terminal of said second resistor opposite to that connected to said voltage supply,
    a ringing current circuit connected to a point in said second branch through intermediary of a bidirectional relay switch breaker in order to send two appropriate ringing half-waves,
    said line circuit being characterized in that it includes:
    a first detector connected to said first circuit branch including means sensitive to the current flowing through said first branch,
    a second detector connected to said second circuit branch including means sensitive to the voltage present at said point, and
    processing means sensitive to the detection signals provided by said first and second detectors in order to process said signals and give information about the on-hook/off-hook type status of said line circuit.

2. A line circuit according to claim 1, characterized in that it further includes:
    a first generator providing pulses of the same frequency as said ringing current each pulse time duration of which extending on either side of the positive zero-crossing of the ringing voltage,
    a second generator providing pulses of the same frequency as said ringing current the pulse time duration of which extending on either side of the negative zero-crossing of the ringing voltage, and in that
    said processing means is also sensitive to the signals produced by said first and second generators.

3. A line circuit according to claim 2, characterized in that said processing means includes:
    a logic AND gate producing a first logic signal in response to the simultaneous presence of signals coming from said detectors and of a pulse coming from said second generator, a first latch set in response to said first signal and producing a second logic signal on its direct output, a logic AND gate producing a third logic signal in response to the simultaneous presence of said detector signals and said second logic signal and of a pulse coming from said first pulse generator, and a second latch set in response to said third logic signal, the direct output of said second latch producing a signal which is a characteristic of the "off hook during ringing phase" status.

4. A line circuit according to claim 3, characterized in that said processing means include a logic AND gate producing a fourth logic signal in response to the simultaneous detection of the signals coming from said detectors and of a signal which is the characteristic of the "no ringing phase" status of the concerned line, said third and fourth logic signals being applied to the set input of said second latch through intermediary of a first OR gate.

5. A line circuit according to claim 4, characterized in that said processing means include a second OR gate which receives as inputs the direct output of said second latch and the output of said first OR gate, the output of said second OR gate producing a signal which is a characteristic of a significative current being present in the line circuit.

6. A line circuit according to any one of the preceding claims, characterized in that said processing means include:

a logic AND gate one input of which receives a "said first detector energized" condition, the second input receiving an "off hook" condition and producing a fifth logic signal in response to both conditions, a logic AND gate, one input of which receives a "said second detector energized" signal, the second input receiving an "off hook" signal, and producing a sixth logic signal in response to both conditions, and a logic AND gate which receives said fifth signal and the complement of said sixth signal, thereby producing a logic signal characteristic of the subscriber operating the ground button of said circuit.

7. A line circuit according to claim 6, characterized in that said processing means include:

a logic AND gate one input of which receives said "first detector energized" condition, the other input receiving the said "second detector energized" condition, thereby producing a seventh logic signal in response to both conditions, and a logic OR gate the inputs of which receive said fifth, sixth and seventh logic signals, respectively, its output producing a logic signal which is a characteristic of the "subscriber's loop closed" condition.

8. A line circuit according to claim 6 characterized in that said ground button operation indicating signal activates a single-shot thereby producing a pulse of predetermined time-length which, after its being inverted, produces an interruption of a same time-length on an output line.

9. A line circuit according to claim 7 characterized in that said ground button operation indicating signal activates a single-shot thereby producing a pulse of predetermined time-length which, after its being inverted, produces an interruption of a same time-length on an output line.

10. A line circuit according to any of claims 1, 2, 3, 4 or 5 characterized in that it includes:

a switch breaker between said terminal of said second resistor and the corresponding terminal of said second half-winding, a third resistor of high resistance between said terminal of said second half winding and said voltage supply, and in that said switch breaker is activated by said processing means so as to switch off said second resistor in case of a misoperation in the line.

11. A line circuit according to claim 10, wherein scanning means are provided for detecting that the line is fed, on the switching network side, and producing a signal in response to this detection, characterized in that it includes:

a logic AND gate one input of which receives said scanning means signal, another input receiving the complement of "said first detector energized" condition, thereby producing an eighth logic signal, rise delay means, the input of which receives said eighth logic signal, a logic AND gate which receives as inputs the output of said delay means, said eighth logic signal and the complement of "off hook" condition, thereby producing a logic signal used in order to open said switch breaker.

12. A line circuit according to claim 11, characterized in that said eighth signal is applied to the input of an OR gate a second input of which receives the signal coming from said second detector, and the output of which is applied as an input to said delay means and said AND gate which is used in order to open said switch breaker.

13. A line circuit according to claim 11 characterized in that a ground button signal is applied to a second rise delay means, the output of said second delay means being used to open said switch breaker.

14. A line circuit according to claim 11 characterized in that said processing means are comprised of:

a logic AND gate which receives as inputs said scanning means signal, the complement of an off-hook signal and the complement of a misoperation signal, thereby providing a ninth logic signal, a logic AND gate which receives as inputs said ninth logic signal and the pulses coming from said first generator, thereby providing a tenth logic signal, a third latch the set input of which receives said tenth logic signal, a logic AND gate which receives as inputs the direct output of said third latch and the complement of a signal indicative of the simultaneous presence of signals coming from said detectors, and which yields as its output a signal which is a characteristic of the ringing status of the concerned line, and a logic AND gate which receives as inputs the complement of said ninth logic signal and the pulses coming from said first generator, and has its output connected to the reset input of said third latch.

15. A line circuit according to claim 14, characterized in that said ringing status signal is also utilized to open said switch breaker.

16. A line circuit according to claim 14, characterized in that said processing means include:

a fall delay means which receives said ringing status signal, and a logic AND gate which receives as inputs the output of said fall delay means and the complement of said ringing status signal, thereby producing an eleventh logic signal which, after its being logically inverted, produces a protection logic signal when the ringing current is being sent.

17. A line circuit according to claim 6, characterized in that said processing means are comprised of:
   a logic AND gate which receives as inputs a loop current signal and a ringing protection signal, thereby producing a "first and second detectors energized" logical signal,
   a logic AND gate which receives as inputs said just mentioned logical signal and said significative current signal, thereby producing an "off-hook" signal, and
   a logic AND gate which receives as an input a ground button indicating signal and said "off-hook" signal thereby producing a logic signal which is a characteristic of the "subscriber's disturbance-free loop" status.

18. A line circuit according to claim 6 characterized in that the potential of said voltage supply and the base potential of said ringing circuit are both identical.

19. A line circuit according to claim 10 characterized in that:
   said means sensitive to that current which flows through said first branch are comprised of a fourth resistor with a first terminal connected to a point in said first branch at said terminal of said first resistor, and a first transistor with a first end terminal connected to the second terminal of said fourth resistor, the second end terminal of said transistor being connected to said first detector, said first detector transforming the voltage appearing at said second terminal into a logic level, means being provided for making said first transistor conducting when the potential at said point in said first branch is lower than the ground potential, and blocking said first transistor in the opposite case, and in that
   said means sensitive to the voltage at said point in said second branch are comprised of a fifth resistor connected between said third resistor and said d.c. voltage supply, and a second transistor a first end terminal of which is connected to said voltage supply, its second end terminal being connected to said second detector, the latter transforming the voltage appearing at said second terminal of said second transistor into a logic level, means being provided for making said second transistor conducting when the potential at said point in said second branch is higher than that of said voltage supply, and blocking said second transistor in the opposite case.

20. A line circuit according to claim 19, essentially characterized in that:
   said voltage supply is negative with respect to ground,
   said first transistor is a NPN-type transistor the emitter of which is connected to said fourth resistor, its collector being connected to said first detector, and its base being connected to ground, a bias resistor being connected between the emitter and the base of said first transistor, and a diode being parallel-connected to said bias resistor in order to shunt the latter when the emitter potential is higher than the ground potential, and
   said second transistor is a NPN-type transistor the emitter of which is connected to said voltage supply, its collector being connected to said second detector, its base being connected to the terminal of said fifth resistor opposite to that connected to said voltage supply, a diode being parallel-connected to said fifth resistor so as to shunt the latter when the potential at the terminal of said fifth resistor which is not that connected to said voltage supply, is lower than the potential present at said voltage supply.

21. A status detector circuit associated with a line circuit of a telephone to detect line status, wherein said line circuit has a reactive impedance characteristic and includes means to apply signals to said line including telephone off-hook d.c. loop current and ringing a.c. voltage, said status detector circuit comprising:
   first detector means sensitive to current phase on said line,
   second detector means sensitive to voltage phase on said line, and
   two pulse sources providing sampling pulses of the same frequency as the ringing voltage, appearing at the positive and negative zero-crossings of the ringing voltage, respectively.
   the phase relationships being such that when only the ringing voltage is applied to the line, only the signals from both detectors and one said source are simultaneously present once per sampling period, and
   when said telephone goes off-hook, the signals from both detectors and the other said source are also simultaneously present once per period, and
   logic means to detect and process said pulse coincidences to detect the status of said line.

22. A status detector circuit associated with a line circuit of a telephone to detect line status, wherein said line circuit has a reactive impedance characteristic and includes means to apply signals to said line including telephone off-hook d.c. loop current and ringing a.c. voltage, said status detector circuit comprising:
   first detector means sensitive to current phase on said line,
   second detector means sensitive to voltage phase on said line, and
   means providing sampling times of the same frequency as the ringing voltage, appearing at zero-crossings of the ringing voltage,
   the phase relationships being such that when said telephone goes off-hook, the shift of the datum of the ringing current caused by superposition of d.c. loop current thereon causes the signals from both detectors to become coincident present at a said sampling time, and
   logic means to detect and process said coincidence to detect the status of said line.

* * * * *